United States Patent
Jensen et al.

(10) Patent No.: US 7,079,595 B2
(45) Date of Patent: Jul. 18, 2006

(54) RADIO RECEIVER HAVING DIRECT DC OFFSET COMPENSATION

(75) Inventors: Henrik T Jensen, Long Beach, CA (US); Brima Ibrahim, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 788 days.

(21) Appl. No.: 10/134,797

(22) Filed: Apr. 29, 2002

(65) Prior Publication Data

US 2003/0202618 A1 Oct. 30, 2003

(51) Int. Cl.
*H04L 25/06* (2006.01)
*H04B 7/00* (2006.01)

(52) U.S. Cl. .................... 375/319; 455/258
(58) Field of Classification Search ........... 375/319, 375/286, 287, 372–376; 455/258, 267; 330/129
See application file for complete search history.

(56) References Cited

U.S. PATENT DOCUMENTS

| | | | |
|---|---|---|---|
| 6,314,278 B1* | 11/2001 | Zamat | 455/239.1 |
| 6,819,910 B1* | 11/2004 | Shi et al. | 455/126 |
| 2002/0160738 A1* | 10/2002 | Allott et al. | 455/304 |
| 2003/0194984 A1* | 10/2003 | Toncich et al. | 455/323 |
| 2003/0197810 A1* | 10/2003 | Jaffe | 348/726 |
| 2003/0202619 A1* | 10/2003 | Ibrahim et al. | 375/319 |
| 2005/0009491 A1* | 1/2005 | Anand et al. | 455/258 |

* cited by examiner

*Primary Examiner*—Khai Tran
(74) *Attorney, Agent, or Firm*—Garlick Harrison & Markison; Timothy W. Markison

(57) ABSTRACT

An FM radio receiver includes a low noise amplifier, down conversion mixing module, local oscillation module, bandpass filter, demodulation module, and a DC offset estimation module. The low noise amplifier, the down conversion mixing module, the bandpass filter, and the demodulation module are operably coupled to recapture data from a received a radio frequency (RF) signal. The local oscillation module is operably coupled to generate the local oscillation based on a reference oscillation and a DC offset correction signal. The DC offset estimation module is operably coupled to generate the DC offset correction signal based on a determined a DC offset. The DC offset estimation module determines the DC offset prior to compensation of the local oscillation, such as during a test sequence and/or during a preamble. As such, the local oscillation initially produces the local oscillation based on the reference oscillation and, once the DC offset correction signal has been determined, the local oscillation is adjusted based on the determined DC offset to substantially match the local oscillation of the transmitting radio.

30 Claims, 8 Drawing Sheets

FM radio receiver 100

FM radio receiver 100

LO module 74

RADIO RECEIVER HAVING DIRECT DC OFFSET COMPENSATION

TECHNICAL FIELD OF THE INVENTION

This invention relates generally to wireless communication systems and more particularly to frequency modulated (FM) radio receivers used in such systems.

BACKGROUND OF THE INVENTION

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel, or channels, (e.g., one or more of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel, or channels. To complete a communication connection between the wireless communication devices, the associated base stations and/or associated access points communicate with each other directly, via a system controller, via the public switch telephone network, via the internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter converts data into RF signals by modulating the data in accordance with the particular wireless communication standard to produce baseband signals and mixes the baseband signal with a local oscillation in one or more intermediate frequency stages to produce the RF signals. The radio receiver generally includes an antenna section, a filtering section, a low noise amplifier, an intermediate frequency (IF) stage, and a demodulator. The antenna section receives RF signals and provides them to the filtering section, which, in turn, passes RF signals of interest to the low noise amplifier. The low noise amplifier amplifies the received RF signals of interest and provides them as amplified RF signals to the IF stage. The IF stage steps down the frequency of the RF signals of interest to an intermediate frequency or to base-band. The IF stage provides the intermediate frequency signals or base-band signals to the demodulator, which recaptures the data in accordance with the demodulation protocol.

For the demodulator to accurately recover data from IF signals or baseband signals, DC offsets must be overcome. As is known, in frequency modulated (FM) systems, one source of DC offsets in the demodulated output result when the clock circuitry of a transmitting radio produces a slightly different clock rate than the clock rate produced by the receiving radio. In other words, the local oscillation within the transmitting radio does not produce the exact same rate of oscillation as the rate produced by the local oscillation in the receiving radio.

To correct for DC offsets, radio receivers include, within the demodulator, a DC offset detection circuit and DC offset compensation circuit. The DC offset detection circuit indicates the level of DC offset while the DC compensation circuit essentially removes the DC offset from the demodulated IF signals or baseband signals. While this technique compensates for DC offset, the frequency offset is present throughout the radio receiver. As is further known, the frequency offset is an error and its presence throughout most of the radio receiver processing can adversely affect the receiving processing function.

Therefore, a need exists for a radio receiver that directly removes the source of the DC offset before it is created.

SUMMARY OF THE INVENTION

The radio receiver having DC offset compensation as disclosed herein substantially meet these needs and others. Such a radio receiver includes a low noise amplifier, down conversion mixing module, local oscillation module, bandpass filter, demodulation module, and a DC offset estimation module. The low noise amplifier is operably coupled to amplify a radio frequency (RF) signal to produce an amplified RF signal. The down conversion mixing module is operably coupled to mix a local oscillation with the amplified RF signal to produce a low intermediate frequency (IF) signal, which may have a carrier frequency of zero to several megahertz. The bandpass filters is operably coupled to filter the low IF signal to produce a filtered signal. The demodulation module is operably coupled to demodulate the low IF signal to produce demodulated data (i.e., recaptured data).

The local oscillation module is operably coupled to generate the local oscillation based on a reference oscillation (e.g., produced by a crystal) and a DC offset correction signal. The DC offset estimation module is operably coupled to generate the DC offset correction signal based on a determined a DC offset. The DC offset estimation module determines the DC offset prior to compensation of the local oscillation, such as during a test sequence and/or during a preamble. As such, the local oscillation initially produces the local oscillation based on the reference oscillation and, once the DC offset correction signal has been determined, the local oscillation is adjusted based on the determined DC offset to substantially match the local oscillation of the transmitting radio. As adjusted, the local oscillation of the receiver will substantially match the local oscillation of the transmitter, essentially eliminated DC offset in the receiver and the adverse affects associated therewith.

The direct DC offset compensation may also be utilized in a self-correcting clocking module, which may be used in a data recovery circuit. Such a self-correcting clocking module includes a reference oscillation source, phase and frequency detection module, charge pump module, low pass filter, voltage control oscillation, and programmable feedback module. The phase and frequency detection module produces a difference signal based on a phase and/or frequency difference between the reference oscillation and a feedback oscillation. The charge pump produces a charge-up or charge-down signal from the different signal, which are subsequently filtered by the low pass filter. The voltage control oscillation produces a recovery clock, or local oscillation, based on the filtered charge-up or charge-down signal.

The programmable feedback module is operably coupled to produce the feedback oscillation by dividing the recovery clock by a divider value. The programmable feedback module generates the divided value in accordance with a predetermined clock value (i.e., a ratio between the reference oscillation and the desired rate of the recovery clock or the local oscillation) and a fractional adjustment value that is based on the DC offset of recovered data. Accordingly, radio receivers and other types of data recovery circuits may reduce the adverse affects caused by DC offsets by incorporating the teachings of the present invention.

DETAIL DESCRIPTION OF A PREFERRED EMBODIMENT

Figure 1:
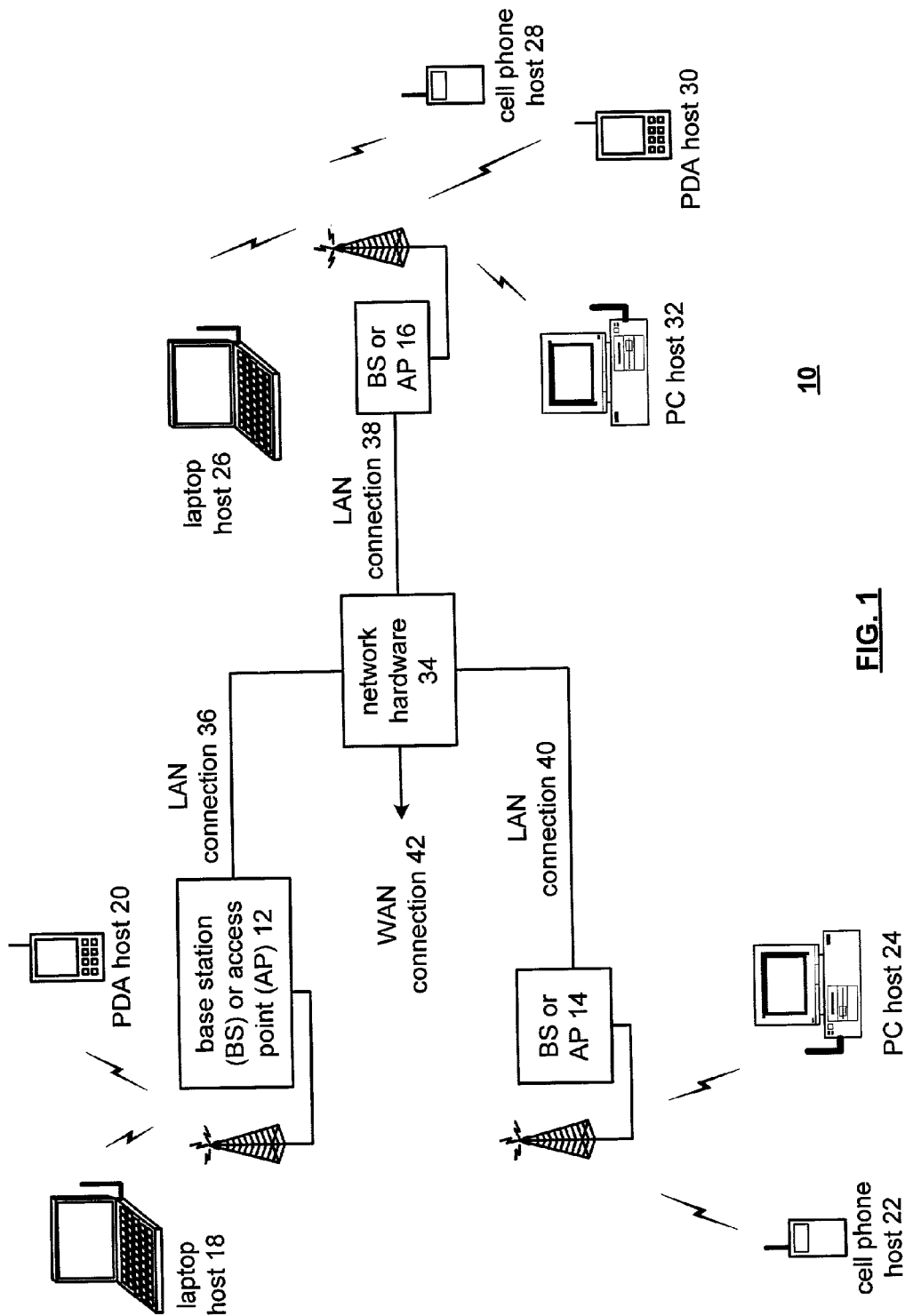
FIG. 1 illustrates a schematic block diagram of a wireless communication system in accordance with the present invention.

FIG. 1 illustrates a schematic block diagram of a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a DC offset compensation concept as disclosed herein to enhance performance of radio receivers, including receivers within radio frequency integrated circuits.

Figure 2:
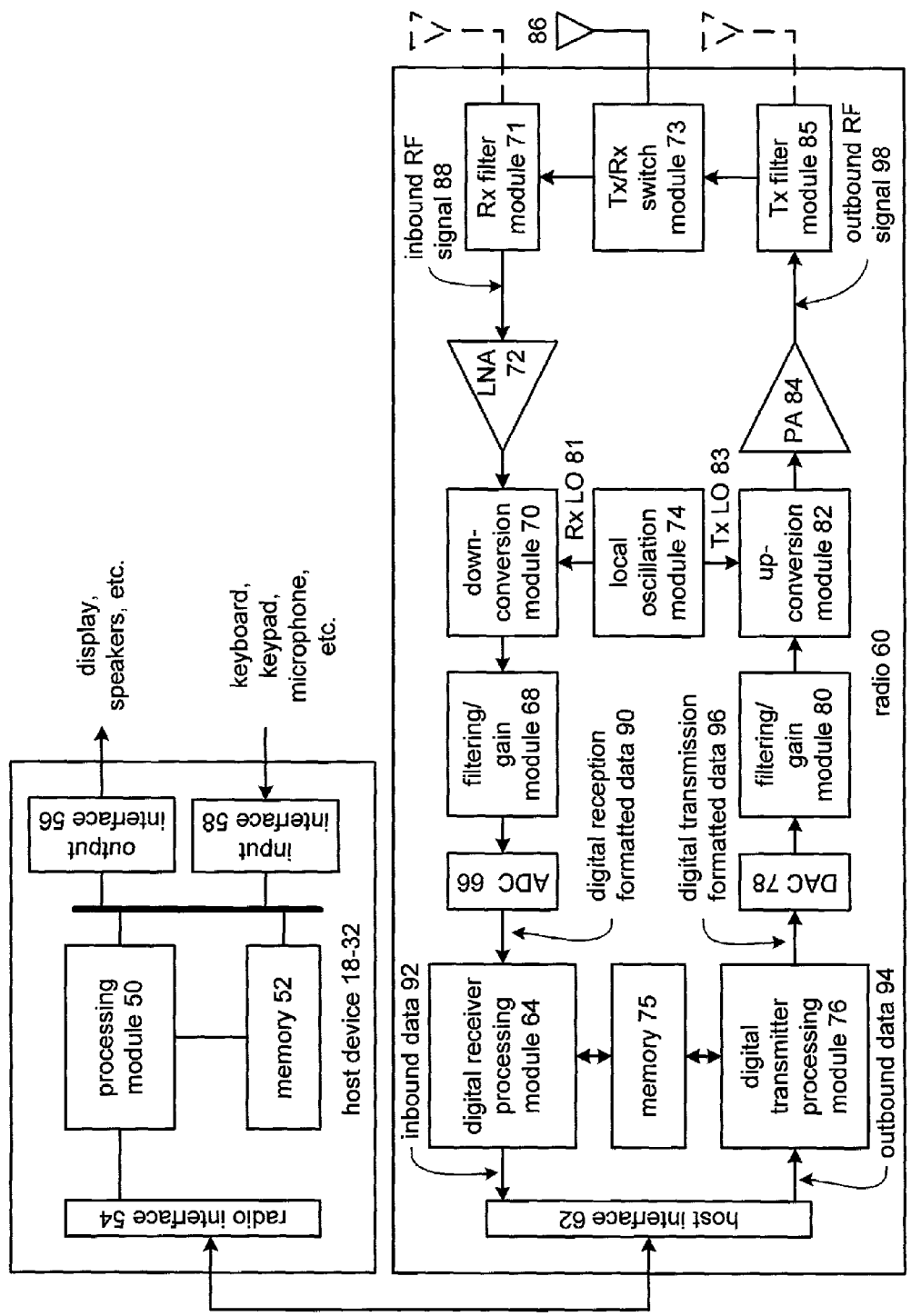
FIG. 2 illustrates a schematic block diagram of a wireless communication device in accordance with the present invention.

FIG. 2 illustrates a schematic block diagram of a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides outbound data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a receiver section, a transmitter section, local oscillation module 74, an antenna switch 73, and an antenna 86. The receiver section includes a digital receiver processing module 64, analog-to-digital converter 66, filtering/gain module 68, down conversion module 70, receiver filter module 71, low noise amplifier 72, and at least a portion of memory 75. The transmitter section includes a digital transmitter processing module 76, digital-to-analog converter 78, filtering/gain module 80, up-conversion module 82, power amplifier 84, transmitter filter module 85, and at least a portion of memory 75. The antenna 86 may be a single antenna that is shared by the transmit and receive paths via the antenna switch 73 or may include separate antennas for the transmit path and receive path and omit the antenna switch. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation provided by local oscillation module 74, which may be implemented in accordance with the teachings of the present invention. The power amplifier 84 amplifies the RF signal to produce outbound RF signal 98, which are subsequently filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71, which filters the RF signal 88 and provides the filtered RF signal to the low noise amplifier 72. The low noise amplifier 72 amplifies the signal and provides the amplified inbound RF signal to the down conversion module 70, which directly converts the amplified inbound RF signal into an inbound low IF signal based on a receiver local oscillation provided by local oscillation module 74, which may be implemented in accordance with the teachings of the present invention. The down conversion module 70 provides the inbound low IF signal to the filtering/gain module 68, which filters and/or adjusts the gain of the signal before providing it to the analog to digital converter 66.

The analog-to-digital converter 66 converts the filtered inbound low IF signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the radio may be implemented a variety of ways to receive RF signals and to transmit RF signals and may be implemented using a single integrated circuit or multiple integrated circuits. Further, at least some of the modules of the radio 60 may be implemented on the same integrated circuit with at least some of the modules of the host device 18–32. Regardless of how the radio is implemented, the concepts of the present invention are applicable.

Figure 3:
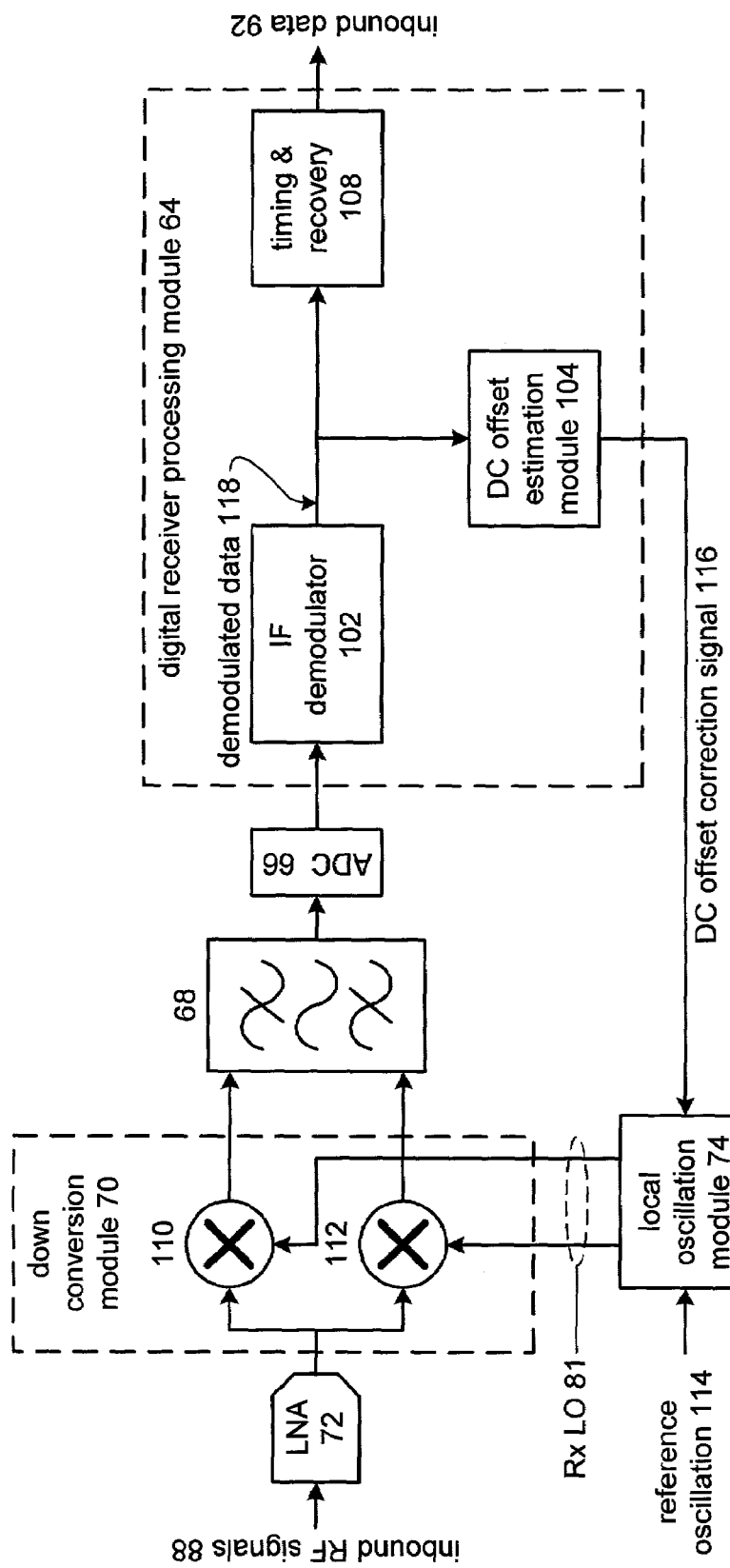
FIG. 3 illustrates a schematic block diagram of an FM radio receiver in accordance with the present invention.

FIG. 3 illustrates a schematic block diagram of an FM radio receiver 100 that may be utilized in the wireless communication device of FIG. 2. The FM radio receiver 100 includes the low noise amplifier 72, down conversion module 70, a bandpass filter for the filtering gain module 68, the analog to digital converter 66, the local oscillation module 74, and the digital receiver processing module 64. In this implementation, the digital receiver processing module 64 is configured to function as an IF demodulator 102, a DC offset estimation module 104, and a timing and recovery module 108. The down conversion module 70 includes a $1^{st}$ mixer 110 and a $2^{nd}$ mixer 112.

In operation, the low noise amplifier 72 receives and filters inbound RF signals 88, which were produced by mixing baseband signals with a local oscillation within a transmitting radio. The filtered signals are provided to the $1^{st}$ and $2^{nd}$ mixers 110 and 112 of the down conversion module 70. The $1^{st}$ mixer 110 mixes an in-phase component of the RF signals 88 with an in-phase component of the receiver local oscillation 81. The $2^{nd}$ mixer 112 mixes a quadrature component of the RF signals 88 with a quadrature component of the receiver local oscillation 81. Initially, the receiver local oscillation 81 is generated solely based on the reference oscillation 114. As such, the receiver local oscillation 81 will most likely not match the local oscillation of the transmitting radio that transmitted the RF signals 88. As such, a DC offset will initially result.

The bandpass filter 68 filters the mixed signals produced by the down-conversion module 70 and provides a low IF signal to the analog to digital converter 66. The analog to digital converter 66 converts the low IF analog signals into low IF digital signals.

The IF demodulator 102 receives the digital IF signals, demodulates them via the IF demodulator 102, to produce demodulated data 118. The DC offset estimation module 104 interprets the demodulated data 118 to determine a DC offset value. The determined DC offset value is used to generate a DC offset correction signal 116, which is feed to the local oscillation module 74. As one of average skill in the art will appreciate, the DC offset estimation module 104 may determine the specific value that the local oscillation module is to be adjusted by and such information is contained within the DC offset correction signal 116. Alternatively, the DC offset correction signal 116 may include an indication of the value of the DC offset, such that the local oscillation module 74 may process the DC offset to determine the amount of local oscillation adjustment needed.

The timing and recovery module 108 receives the demodulated data 118 and produces therefrom inbound data 92. Initially, prior to direct DC offset compensation, the inbound data 92 may include errors. As such, it is desirable to generate the DC offset correction signal 116 and modify the receiver local oscillation 81 as soon as possible such that the inbound data 92 is corrected as quickly as possible. For instance, it is desirable to determine the DC offset correction signal 116 during a training sequence of the radio receiver or during the initial phases of receiving a preamble of a signal.

Figure 4:
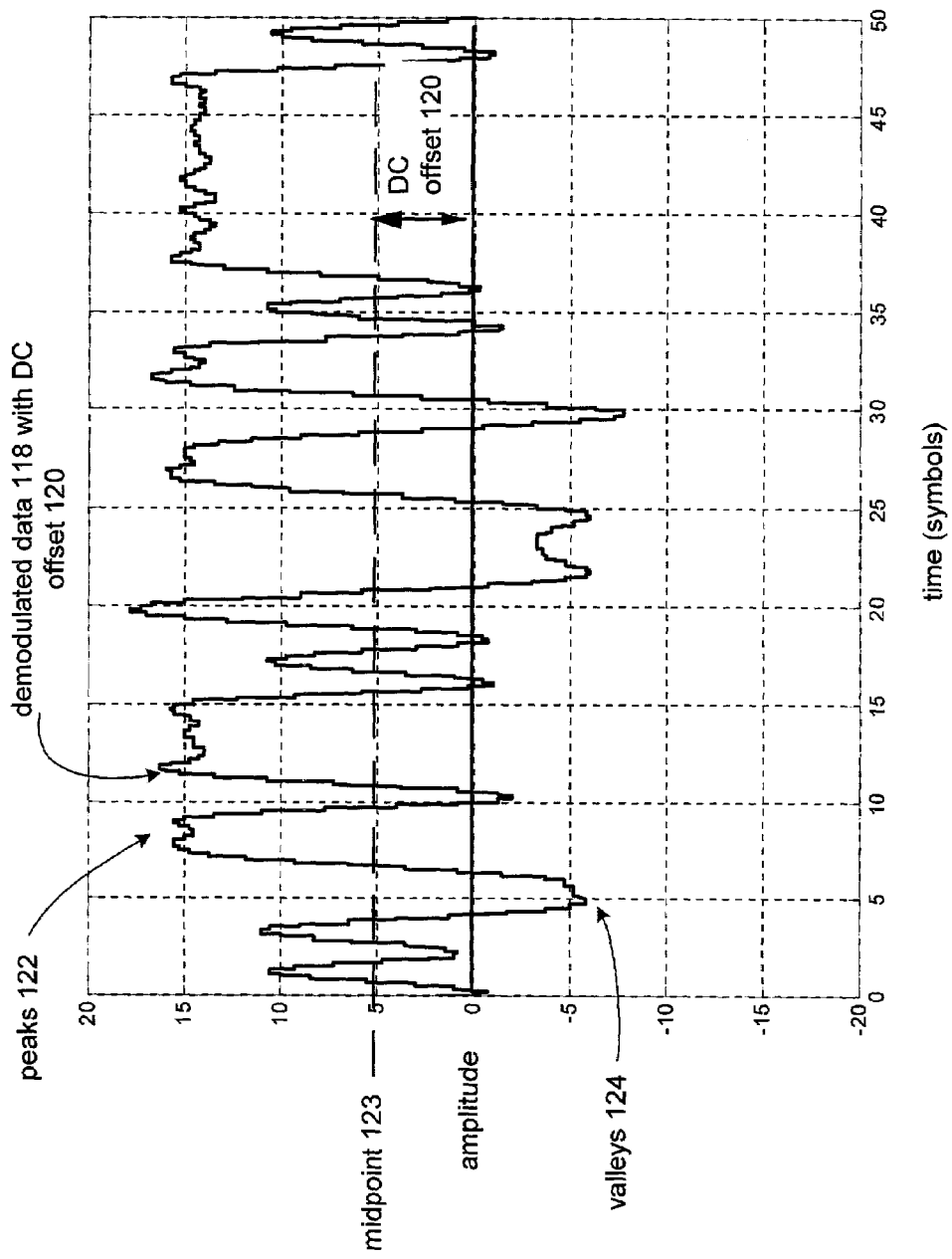
FIG. 4 illustrates a graphical representation of typical demodulated data without DC offset correction.
Figure 5:
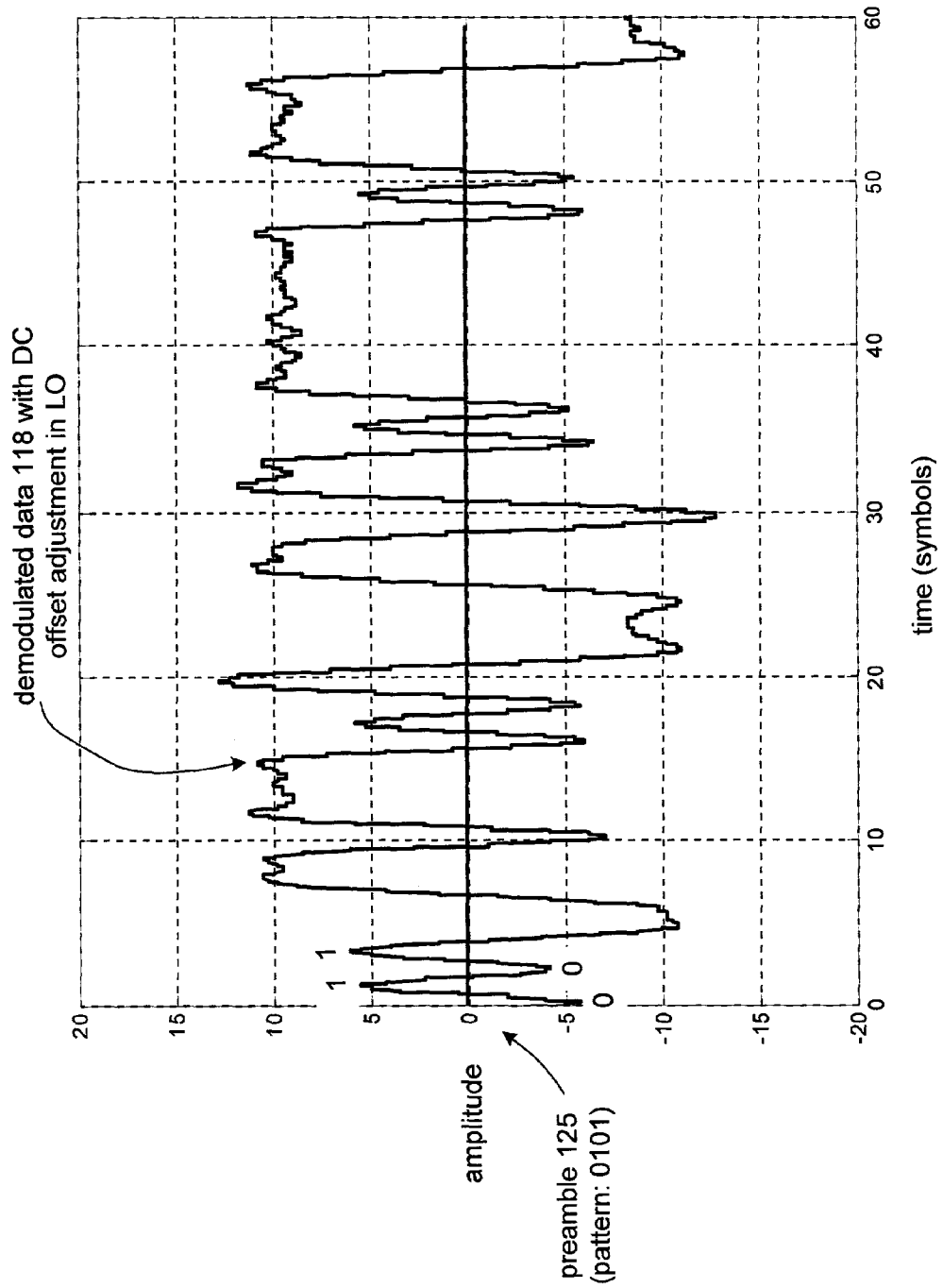
FIG. 5 illustrates a graphical representation of typical demodulated data with DC offset correction in accordance with the present invention.

FIGS. 4 and 5 illustrate the demodulated data 118 with and without DC offset 120. In particular, FIG. 4 illustrates the demodulated data 118 with the DC offset. The peaks and valleys 122 and 124 of the demodulated data are identified. The DC offset estimation module 104 uses the peaks and valleys to determine a midpoint 123 between an average peak value and an average valley value. The DC offset estimation module 104 compares the midpoint 123 to zero amplitude and determines the DC offset 120 to be the difference between the midpoint 123 and the zero amplitude.

FIG. 5 illustrates the demodulated data 118 that is produced after the local oscillation is adjusted in accordance with the DC offset correction signal 116. In this particular example, the beginning of the demodulated data 118 includes a preamble 125, which has a particular pattern. In this example, the pattern is 0101. As such, it is desirable to generate the DC offset correction signal 116 during this preamble phase such that the receiver local oscillation 81 may be corrected (i.e., adjusted to match the local oscillation of the transmitting radio) to remove DC offset before it is created.

Figure 6:
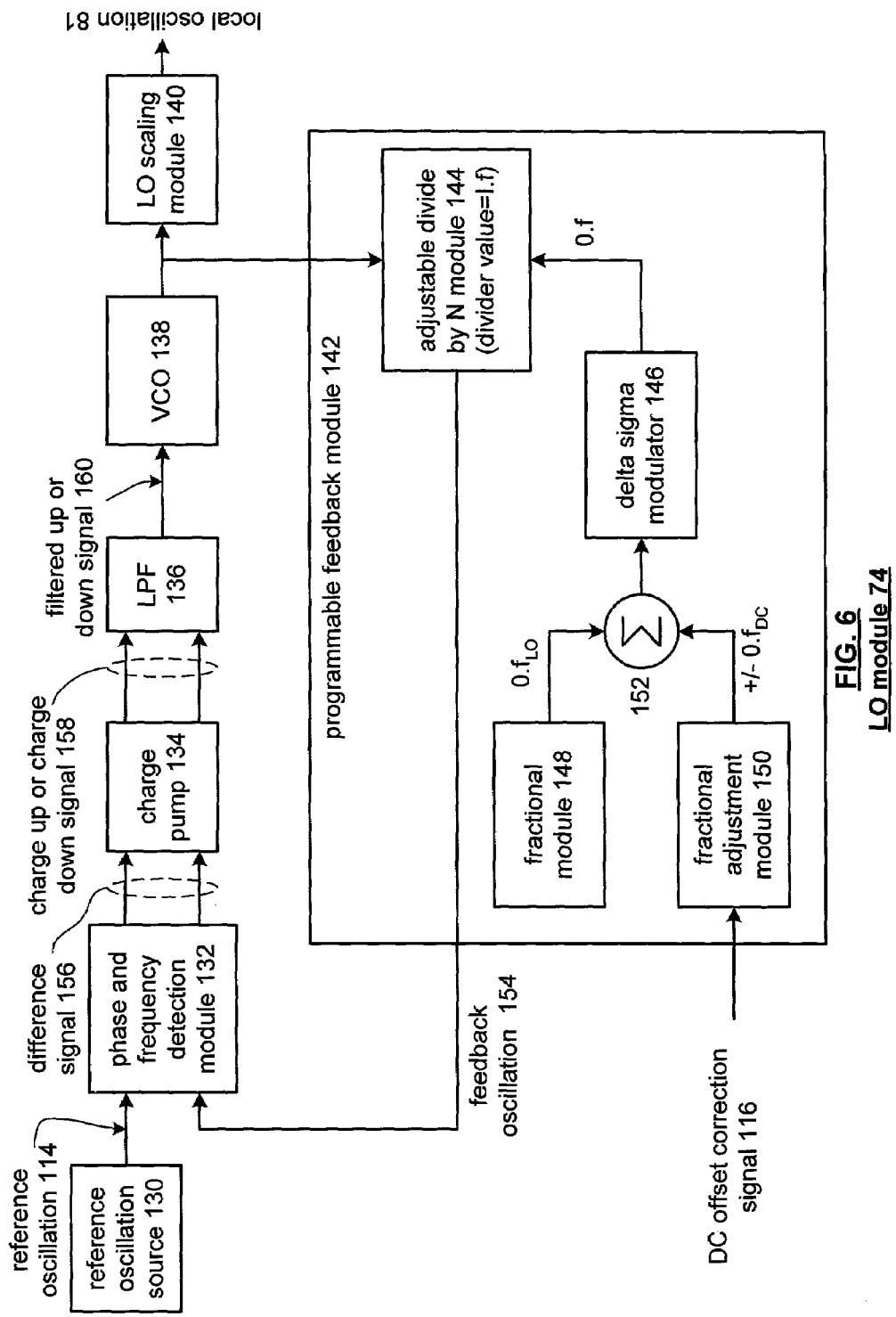
FIG. 6 illustrates a schematic block diagram of a local oscillation module in accordance with the present invention.

FIG. 6 illustrates a schematic block diagram of the local oscillation module 74 and/or a self-correcting clock circuit that may be utilized in data recovery circuits. The local oscillation module 74 includes a reference oscillation source 130, a phase and frequency detection module 132, a charge pump 134, a low pass filter 136, a voltage control oscillator 138, a local oscillation scaling module 140, which is optional, and a programmable feedback module 142. The programmable feedback module 142 includes an adjustable divide by N-module 144, Delta Sigma modulator 146, fractional module 148, fractional adjustment module 150, and a summing module 152.

The reference oscillation source 130, which may be a crystal, produces a reference oscillation 114. The phase and frequency detection module 132 compares the reference oscillation 114 with a feedback oscillation 154 to produce a difference signal 156. The charge pump 134 converts the difference signal into a charge-up signal or a charge-down signal 158. The low pass filter filters the charge-up or charge-down signal to produce a filtered-up or down signal 160. The voltage control oscillator 138 generates an output oscillation in accordance with the filtered-up or filtered-down signal 160. The oscillation output is provided to the programmable feedback module 142 and may also be provided to a local oscillation scaling module 140. If the local oscillation module 74 does not include the local oscillation scaling module 140, the output of the VCO is the local oscillation.

The local oscillation scaling module 140 may be constructed in such a way that the output oscillation produced by the voltage control oscillator 138 is approximately ⅔rds the rate of the receiver local oscillation 81. As such, the scaling module 140 may divide the output oscillation from the voltage control oscillator 138 by 2 and then sum the divided by 2 value (i.e., ⅓rd of the desired local oscillation) with the output oscillation (i.e., ⅔rds of the desired local oscillation) to produce the local oscillation 81.

The adjustable divide by N-module 144 divides the output oscillation of the VCO 138 by a divider value. The divider value includes an integer portion, which is represented by I, and a fractional portion, which is represented by f. The fractional portion 0.f, is produced by a combination of the fractional portion (i.e., $0.f_{LO}$) stored in fractional module 148 and a fractional adjustment portion (i.e., $0.f_{DC}$) produced by the fractional adjustment module 150. The fractional value ($0.f_{LO}$) corresponds to the desired fractional portion of the divider value. For instance, assume that the desired output frequency of the voltage control oscillator 138 is 1 gigahertz and the reference oscillation is 15 megahertz. As such, the divider value, predetermined local oscillation value, for this example is 66.667. As such, the integer portion of the divider value for this example is 66 and the fractional value is 0.667. If, however, the local oscillation of the transmitting radio, which produced the received RF signals, has a VCO output oscillation of 1.002 gigahertz, the receiver will have a DC offset.

Accordingly, the fractional adjustment module 150 generates a fractional adjustment value based on the DC offset correction signal 116 to adjust the local oscillation 81 such that it substantially matches the local oscillation of the transmitting radio. For this example, the divider value to achieve a 1.002 gigahertz output from VCO 138 is 66.800. Since the fractional module is providing a fractional value of 0.667, the fractional adjustment module 150 needs to produce a fractional value of 0.133 (i.e., 0.800 −0.667). The summing module 152 sums the fractional portion produced by fractional module 148 and the fractional adjustment value produced by the fractional adjustment module 150. The summed fractional portion is processed by the Sigma Delta modulator 146 to produce the resultant fractional value (i.e., 0.f), which adjusted the divider value of the adjustable divide by N-module 144 accordingly.

As one of average skill in the art will appreciate, the fractional adjustment module 150 may be a lookup table that includes a plurality of fractional adjustment values that are indexed by the DC offset correction signal. The indexed fractional adjustment value may then be stored in a register, which is provided to summing module 152. Alternatively, the fractional adjustment module 150 may include processing that determines the fractional adjustment value from the DC offset correction signal 116 to produce the desired fractional adjustment value. As a further alternative, the DC offset estimation module 104 may determine the fractional adjustment value such that the fractional adjustment module 150 includes a register for storing the fractional adjustment value. Regardless of the particular method for determining the fractional adjustment value, the DC offset is corrected by adjusting the local oscillation of the receiver to substantially match the local oscillation of the radio that transmitted the RF signals. As such, radio receivers have negligible DC offset, thus eliminating any potential errors associated with DC offsets.

Figure 7:
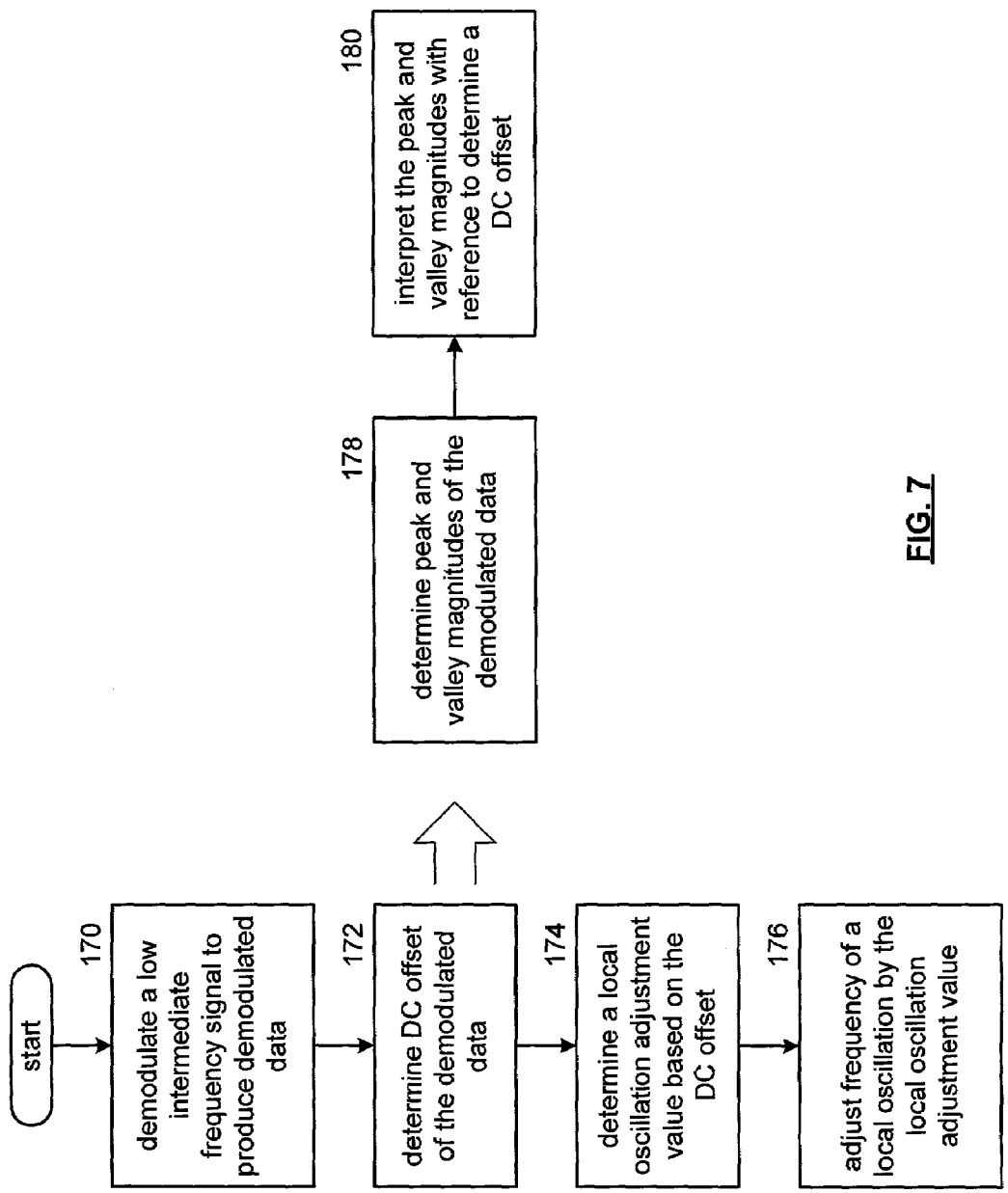
FIG. 7 illustrates a logic diagram of a method for DC offset compensation in an FM radio receiver in accordance with the present invention.

FIG. 7 illustrates a logic diagram of a method for DC offset compensation in an FM radio receiver. The process begins at Step 170 where a low intermediate frequency signal is demodulated to produce demodulated data. The process then proceeds to Step 172 where a DC offset of the demodulated data is determined. This may be done as illustrated in Steps 178 and 180. At Step 178, peak and valley magnitudes of the demodulated data are determined. Based on the peak and valley magnitudes, a midpoint value of the demodulated data is determined. The process then proceeds to Step 180 where midpoint of the peak and valley magnitudes are interpreted with reference to the zero magnitude to determine a DC offset.

Returning to the main flow of the logic diagram, the process proceeds to Step 174 where a local oscillation adjustment value is determined based on the DC offset. The process then proceeds to Step 176 where the frequency of the local oscillation is adjusted in accordance with the local oscillation adjustment value.

Figure 8:
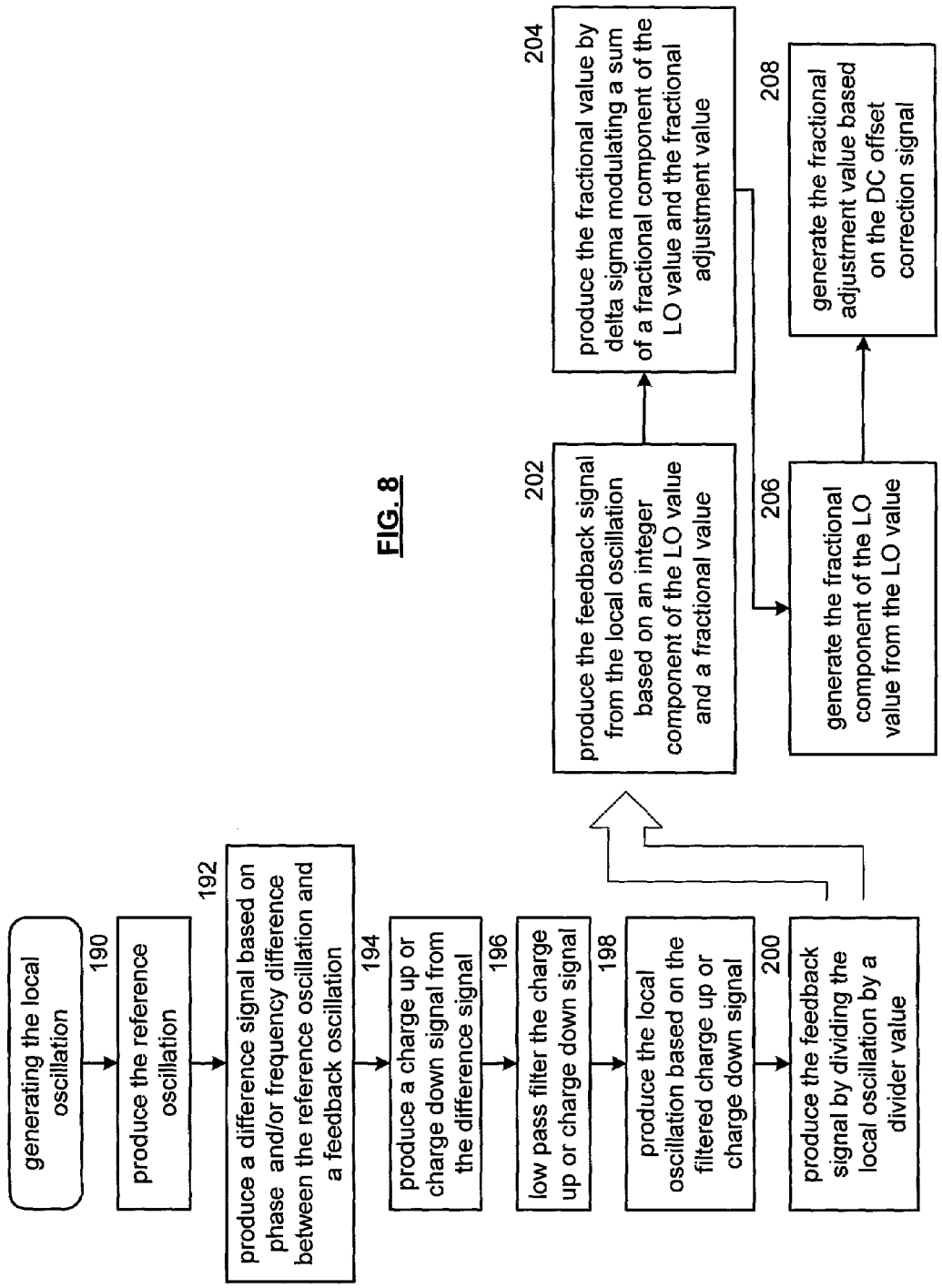
FIG. 8 illustrates a logic diagram that further describes the generating of the local oscillation of the logic diagram of FIG. 7.

FIG. 8 illustrates a logic diagram regarding the generation of the local oscillation of Step 176 of FIG. 7. The processing begins at Step 190 where a reference oscillation is produced. The process then proceeds to Step 192 where a difference signal is produced based on a phase and/or frequency difference between the reference oscillation and a feedback oscillation. The process then proceeds to Step 194 where a charge-up or charge-down signal is produced from the difference signal.

The process then proceeds to Step 196 where the charge-up or charge-down signal is low pass filtered to produce a filtered charge-up or charge-down signal. The process then proceeds to Step 198 where the local oscillation is produced based on the filtered charge-up or filtered charge-down signal. Alternatively, the local oscillation, within a self-correcting clock module, may be referred to as a recovery clock. The process then proceeds to Step 200 where the feedback signal is produced by dividing the local oscillation by a divider value. The divider value is in accordance with a predetermined local oscillation value and a fractional adjustment value that is based on the DC offset correction signal. The predetermined local oscillation value represents the divider value needed to produce the local oscillation from the reference oscillation without accounting for DC offset. The fractional adjustment value causes the divider value to be adjusted such that the local oscillation of the receiver substantially matches the local oscillation of the transmitting radio.

The correction of the feedback signal may be further described with reference to Steps 202–208. At Step 202, the feedback oscillation is produced from the local oscillation, or VCO output, based on the divider value, which includes an integer value and a fractional value. The process then proceeds to Step 204 where the fractional value is produced by a Delta Sigma modulation on a sum of a fractional component of the local oscillation value and the fractional adjustment value. The process then proceeds to Step 206 where the fractional component of the local oscillation value is generated based on the local oscillation value. The process then proceeds to Step 208 where the fractional adjustment value is generated based on the DC offset correction signal. This may be done by utilizing a lookup table to index one of a plurality of fractional adjustment values based on the DC offset correction signal and storing the fractional adjustment value. Alternatively, the fractional adjustment value may be calculated based on the DC offset correction signal.

The preceding discussion has presented a method and apparatus for directly compensating DC offset within a radio receiver. By adjusting the local oscillation of the radio receiver to substantially match the local oscillation of the transmitting radio, DC offset is effectively removed from the radio receiver. As such, errors associated with DC offset are eliminated. As one of average skill in the art will appreciate, other embodiments may be derived from the teaching of the present invention, without deviating from the scope of the claims.

What is claimed is:

1. A frequency modulation (FM) radio receiver having direct current (DC) offset compensation, the FM radio receiver comprises:
   low noise amplifier operably coupled to amplify a radio frequency (RF) signal to produce an amplified RF signal;
   down conversion mixing module operably coupled to mix a local oscillation with the amplified RF signal to produce a low intermediate frequency (IF) signal;
   local oscillation module operably coupled to produce the local oscillation based on a reference oscillation and a DC offset correction signal;
   bandpass filter operably coupled to filter the low IF signal to produce a filtered signal;
   demodulation module operably coupled to demodulate the low IF signal to produce demodulated data; and
   DC offset estimation module operably coupled to determine DC offset of the demodulated data by determining peak and valley magnitudes of the demodulated data and by interpreting the peak and valley magnitudes with reference to determine the DC offset, the DC offset estimation module to generate the DC offset correction signal based on the determined DC offset.

2. The FM radio receiver of claim 1 further comprises:
   processing module; and
   memory operably coupled to the processing module, wherein the memory stores operational instructions that cause the processing module to function as the DC offset estimation module and to determine the DC offset correction signal.

3. The FM radio receiver of claim 1, wherein the local oscillation module further comprises:
   reference oscillation source to produce the reference oscillation;
   phase and frequency detection module operably coupled to produce a difference signal based on at least one of: phase difference and frequency difference between the reference oscillation and a feedback oscillation;
   charge pump module operably coupled to produce a charge up or charge down signal from the difference signal;
   low pass filter operably coupled to filter the charge up or charge down signal to produce a filtered charge up or charge down signal;
   voltage controlled oscillator operably coupled to produce an output oscillation corresponding to the local oscillation based on the filtered charge up or charge down signal; and
   programmable feedback module operably coupled to produce the feedback signal by dividing the output oscillation by a divider value, wherein the divider value is in accordance with a predetermined local oscillation value and a fractional adjustment value that is based on the DC offset correction signal.

4. The FM radio receiver of claim 3, wherein the programmable feedback module further comprises:
   adjustable divided by N module operably coupled to produce the feedback oscillation from the local oscillation based on an integer component of the predetermined local oscillation value and a fractional value;
   delta sigma modulator operably coupled to produce the fractional value based on a fractional component of the predetermined local oscillation value and the fractional adjustment value;

fraction module operably coupled to generate the fractional component of the predetermined, local oscillation value from the predetermined local oscillation value; and fractional adjustment module operably coupled to generate the fractional adjustment value based on the DC offset correction signal.

5. The FM radio receiver of claim 4, wherein the fractional adjustment module further comprises:

look up table that includes a plurality of fractional adjustment values indexed by a plurality of DC offset correction signals, wherein the fraction adjustment value is one of the plurality of fractional adjustment values and is indexed by the DC offset correction signal, which is one of the plurality of DC offset correction signals; and a register for storing the fractional adjustment value.

6. The FM radio receiver of claim 4, wherein the fractional adjustment module further comprises:

processing module operably coupled to execute operational instructions to determine the fractional adjustment value from the DC offset correction signal.

7. The FM radio receiver of claim 4 further comprises:

the DC offset estimation module includes processing module operably coupled to execute operational instructions to determine the fractional adjustment value from the DC offset correction signal; and the fractional adjustment module includes a register for storing the fractional adjustment value.

8. A method for direct current (DC) offset compensation in a frequency modulated (FM) radio receiver, the method comprises:

demodulating a low intermediate frequency (IF) signal to produce demodulated data;

determining DC offset of the demodulated data by determining peak and valley magnitudes of the demodulated data and by interpreting the peak and valley magnitudes with reference to determine the DC offset;

determining a local oscillation adjustment value based on the DC offset; and adjusting frequency of a local oscillation by the local oscillation adjustment value.

9. The method of claim 8 further comprises generating the local oscillation by:

producing a reference oscillation;

producing a difference signal based on at least one of: phase difference and frequency difference between the reference oscillation and a feedback oscillation;

producing a charge up or charge down signal from the difference signal;

low pass filtering the charge up or charge down signal to produce a filtered charge up or charge down signal;

producing the local oscillation based on the filtered charge up or charge down signal; and producing the feedback oscillation by dividing the local oscillation by a divider value, wherein the divider value is in accordance with a predetermined local oscillation value and a fractional adjustment value that is based on the DC offset correction signal.

10. The method of claim 9, wherein the producing the feedback signal further comprises:

producing the feedback oscillation from the local oscillation based on an integer component of the predetermined local oscillation value and a fractional value;

producing the fractional value by delta sigma modulating a sum of a fractional component of the predetermined local oscillation value and the fractional adjustment value;

generating the fractional component of the predetermined local oscillation value from the predetermined local oscillation value; and generating the fractional adjustment value based on the DC offset correction signal.

11. The method of claim 10, wherein the generating the fractional adjustment value further comprises:

looking up the fractional adjustment value in a table that includes a plurality of fractional adjustment values indexed by a plurality of DC offset correction signals, wherein the fraction adjustment value is one of the plurality of fractional adjustment values and is indexed by the DC offset correction signal, which is one of the plurality of DC offset correction signals; and storing the fractional adjustment value.

12. The method of claim 10, wherein the generating the fractional adjustment value further comprises:

determining the fractional adjustment value from the DC offset correction signal.

13. A self-correcting clocking module for use in a data recovery circuit, the self-correcting clock module comprises:

reference oscillation source to produce a reference oscillation;

phase and frequency detection module operably coupled to produce a difference signal based on at least one of: phase difference and frequency difference between the reference oscillation and a feedback oscillation;

charge pump module operably coupled to produce a charge up or charge down signal from the difference signal;

low pass filter operably coupled to filter the charge up or charge down signal to produce a filtered charge up or charge down signal;

voltage controlled oscillator operably coupled to produce a recovery clock based on the filtered charge up or charge down signal; and programmable feedback module operably coupled to produce the feedback oscillation by dividing the recovery clock by a divider value, wherein the divider value is in accordance with a predetermined clock value and a fractional adjustment value that is based on direct current (DC) offset of recovered data.

14. The self-correcting clocking module of claim 13, wherein the programmable feedback module further comprises:

adjustable divided by N module operably coupled to produce the feedback oscillation from the recovery clock based on an integer component of the predetermined clock value and a fractional value;

delta sigma modulator operably coupled to produce the fractional value based on a fractional component of the predetermined clock value and the fractional adjustment value;

fraction module operably coupled to generate the fractional component of the predetermined clock value from the predetermined clock value; and fractional adjustment module operably coupled to generate the fractional adjustment value based on a DC offset correction signal that indicates the DC offset of the recovered data.

15. The self-correcting clocking module of claim 14, wherein the fractional adjustment module further comprises:

look up table that includes a plurality of fractional adjustment values indexed by a plurality of DC offset correction signals, wherein the fraction adjustment value is one of the plurality of fractional adjustment values and is indexed by the DC offset correction signal, which is one of the plurality of DC offset correction signals; and
a register for storing the fractional adjustment value.

16. The self-correcting clocking module of claim 14, wherein the fractional adjustment module further comprises:
processing module operably coupled to execute operational instructions to determine the fractional adjustment value from the DC offset correction signal.

17. A method for self-correcting clocking module for use in a data recovery circuit, the method comprises:
producing a reference oscillation;
producing a difference signal based on at least one of: phase difference and frequency difference between the reference oscillation and a feedback oscillation;
producing a charge up or charge down signal from the difference signal;
low pass filtering the charge up or charge down signal to produce a filtered charge up or charge down signal;
producing a recovery clock based on the filtered charge up or charge down signal; and
producing the feedback oscillation by dividing the recovery clock by a divider value, wherein the divider value is in accordance with a predetermined clock value and a fractional adjustment value that is based on direct current (DC) offset of recovered data.

18. The method of claim 17, wherein the producing the feedback signal further comprises:
producing the feedback oscillation from the recovery clock based on an integer component of the predetermined clock value and a fractional value;
producing the fractional value by delta sigma modulating a sum of a fractional component of the predetermined clock value and the fractional adjustment value;
generating the fractional component of the predetermined clock value from the predetermined clock value; and
generating the fractional adjustment value based on a DC offset correction signal that indicates the DC offset of the recovered data.

19. The method of claim 18, wherein the generating the fractional adjustment value further comprises:
looking up the fractional adjustment value in a table that includes a plurality of fractional adjustment values indexed by a plurality of DC offset correction signals, wherein the fraction adjustment value is one of the plurality of fractional adjustment values and is indexed by the DC offset correction signal, which is one of the plurality of DC offset correction signals; and
storing the fractional adjustment value.

20. The method of claim 18, wherein the generating the fractional adjustment value further comprises:
determining the fractional adjustment value from the DC offset correction signal.

21. An apparatus for direct current (DC) offset compensation in a frequency modulated (FM) radio receiver, the apparatus comprises:
processing module; and
memory operably coupled to the processing module, wherein the memory includes operational instructions that cause the processing module to:
demodulate a low intermediate frequency (IF) signal to produce demodulated data;
determine DC offset of the demodulated data by determining peak and valley magnitudes of the demodulated data and by interpreting the peak and valley magnitudes with reference to determine the DC offset;
determine a local oscillation adjustment value based on the DC offset; and
adjust frequency of a local oscillation by the local oscillation adjustment value.

22. The apparatus of claim 21, wherein the memory further comprises operational instructions that cause the processing module to determine the DC offset.

23. The apparatus of claim 21, wherein the memory further comprises operational instructions that cause the processing module to generate the local oscillation by:
producing a reference oscillation;
producing a difference signal based on at least one of: phase difference and frequency difference between the reference oscillation and a feedback oscillation;
producing a charge up or charge down signal from the difference signal;
low pass filtering the charge up or charge down signal to produce a filtered charge up or charge down signal;
producing the local oscillation based on the filtered charge up or charge down signal; and
producing the feedback oscillation by dividing the local oscillation by a divider value, wherein the divider value is in accordance with a predetermined local oscillation value and a fractional adjustment value that is based on the DC offset correction signal.

24. The apparatus of claim 23, wherein the memory further comprises operational instructions that cause the processing module to produce the feedback signal by:
producing the feedback oscillation from the local oscillation based on an integer component of the predetermined local oscillation value and a fractional value;
producing the fractional value by delta sigma modulating a sum of a fractional component of the predetermined local oscillation value and the fractional adjustment value;
generating the fractional component of the predetermined local oscillation value from the predetermined local oscillation value; and
generating the fractional adjustment value based on the DC offset correction signal.

25. The apparatus of claim 23, wherein the memory further comprises operational instructions that cause the processing module to generate the fractional adjustment value by:
looking up the fractional adjustment value in a table that includes a plurality of fractional adjustment values indexed by a plurality of DC offset correction signals, wherein the fraction adjustment value is one of the plurality of fractional adjustment values and is indexed by the DC offset correction signal, which is one of the plurality of DC offset correction signals; and
storing the fractional adjustment value.

26. The apparatus of claim 21, wherein the memory further comprises operational instructions that cause the processing module to generate the fractional adjustment value by:
determining the fractional adjustment value from the DC offset correction signal.

27. A self-correcting clock module for use in a data recovery circuit, the self-correcting clock module comprises:
processing module; and
memory operably coupled to the processing module, wherein the memory includes operational instructions that cause the processing module to:
produce a reference oscillation;
produce a difference signal based on at least one of: phase difference and frequency difference between the reference oscillation and a feedback oscillation;

produce a charge up or charge down signal from the difference signal;

low pass filter the charge up or charge down signal to produce a filtered charge up or charge down signal;

produce a recovery clock based on the filtered charge up or charge down signal; and produce the feedback oscillation by dividing the recovery clock by a divider value, wherein the divider value is in accordance with a predetermined clock value and a fractional adjustment value that is based on direct current (DC) offset of recovered data.

28. The self-correcting clock module of claim 27, wherein the memory further comprises operational instructions that cause the processing module to produce the feedback signal by:

producing the feedback oscillation from the recovery clock based on an integer component of the predetermined clock value and a fractional value;

producing the fractional value by delta sigma modulating a sum of a fractional component of the predetermined clock value and the fractional adjustment value;

generating the fractional component of the predetermined clock value from the predetermined clock value; and generating the fractional adjustment value based on a DC offset correction signal that indicates the DC offset of the recovered data.

29. The self-correcting clock module of claim 28, wherein the memory further comprises operational instructions that cause the processing module to generate the fractional adjustment value by:

looking up the fractional adjustment value in a table that includes a plurality of fractional adjustment values indexed by a plurality of DC offset correction signals, wherein the fraction adjustment value is one of the plurality of fractional adjustment values and is indexed by the DC offset correction signal, which is one of the plurality of DC offset correction signals; and storing the fractional adjustment value.

30. The self-correcting clock module of claim 29, wherein the memory further comprises operational instructions that cause the processing module to generate the fractional adjustment value by:

determining the fractional adjustment value from the DC offset correction signal.

* * * * *